United States Patent
Ray et al.

(10) Patent No.: US 7,515,104 B2
(45) Date of Patent: Apr. 7, 2009

(54) STRUCTURED ARRAY GEOLOCATION

(75) Inventors: Gary A Ray, Issaquah, WA (US); Henry E. Halladay, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 172 days.

(21) Appl. No.: 11/626,240

(22) Filed: Jan. 23, 2007

(65) Prior Publication Data

US 2008/0174490 A1 Jul. 24, 2008

(51) Int. Cl.
*G01S 3/02* (2006.01)
(52) U.S. Cl. ..................................... 342/464
(58) Field of Classification Search ................. 342/450, 342/464
See application file for complete search history.

(56) References Cited

U.S. PATENT DOCUMENTS

| | | | | |
|---|---|---|---|---|
| 6,108,315 | A * | 8/2000 | Freeburg et al. | 370/310 |
| 6,414,634 | B1 | 7/2002 | Tekinay | |
| 7,006,838 | B2 | 2/2006 | Diener et al. | |
| 7,079,025 | B2 * | 7/2006 | Michalson et al. | 340/539.13 |
| 7,312,752 | B2 * | 12/2007 | Smith et al. | 342/464 |
| 2006/0071780 | A1 * | 4/2006 | McFarland | 340/539.2 |
| 2006/0087475 | A1 | 4/2006 | Struckman | |
| 2006/0125695 | A1 | 6/2006 | Kennedy et al. | |
| 2008/0036660 | A1 * | 2/2008 | Matsuoka et al. | 342/463 |

OTHER PUBLICATIONS

Whitehouse, Kamin et al, "Calibration as Parameter Estimation in Sensor Networks," WSNA 2002, Sep. 28, 2002, pp. 59-67.*
Shang, Yi, et al, "Localization from Mere Connectivity", MobiHoc 2003, Jun. 1, 2003, pp. 201-212.*
Taylor, Christopher et al, "Simultaneous Localization, Calibration and Tracking in an ad Hoc Sensor Network," IPSN '06, Apr. 2006.*
Moura, "A Spatial Smoothing Formulation for Location Systems", IEEE Journal of Oceanic Engineering, vol. 0E-8, No. 3, Jul. 1983, 15 pgs.
Niculescu et al., "Ad Hoc Positioning system (APS)", GLOBECOM 2001, Nov. 2001, 6 pgs.
Sathyan et al., "Geolocation of Multiple Emitters in the Presence of Clutter", Proceedings SPIE, vol. 5429, 2004, pp. 66-76.
Sathyan et al., "Passive Geolocation and Tracking of an Unknown Number of Emitters", IEEE Trans. on Aerospace and Electronic Systems, 2006, vol. 42, No. 2, pp. 740-750.

* cited by examiner

*Primary Examiner*—Gregory C Issing
(74) *Attorney, Agent, or Firm*—Lee & Hayes, PLLC

(57) ABSTRACT

Methods and systems for providing an improved geolocation of a plurality of transmitters are disclosed. In one embodiment, a method for providing a geolocation of a plurality of transmitters includes determining a relative location of each transmitter in the plurality of transmitters with respect to at least one other transmitter in the plurality of transmitters; determining an initial geolocation of the plurality of transmitters; computing a calibration factor by comparing the initial geolocation of the plurality of transmitters to the relative locations of the plurality of transmitters; and determining a calibrated geolocation of the plurality transmitters by adjusting at least one final geolocation of the plurality of transmitters by the calibration factor.

19 Claims, 7 Drawing Sheets

700 ⟶

800 ⟶

STRUCTURED ARRAY GEOLOCATION

FIELD OF THE INVENTION

The invention relates to methods and systems for providing a geolocation of transmitters, and more specifically, to methods and systems for providing a geolocation of a plurality of transmitters with known relative locations.

BACKGROUND OF THE INVENTION

Navigation is often conducted with reference to known geographical locations. For example, landmarks, street names, and geographical features are traditional resources utilized to establish a location of a person, object, or place, and thus enable informed navigation. It is often useful to determine the location of an object or place off in the distance in order to navigate, especially when navigating over large expanses which do not facilitate the use of the aforementioned traditional resources, such as when traversing the ocean or a desert. It is also useful to obtain location information of a person, object, or place to track its relative motion or other useful attributes.

While modern means of position location include technologies such as global positioning system (GPS) and laser positioning, such technologies are not without their limitations. For example, GPS may not work effectively when an obstruction exists between a receiver and a positioning satellite, such as inside buildings or under water. Conventional means of position location may also include measuring a radio response from a transmitter located in a field of operation.

Factors such as the environment, measurement component variations, transmitter variations, propagation effects, multipath, and the like may all contribute to non-precise geolocations using radio response technologies. Therefore, there exists a need for improved methods and systems for providing the geolocation of a plurality of transmitters.

SUMMARY

Embodiments of methods and systems for providing a geolocation of a plurality of transmitters with known relative locations are disclosed. Embodiments of methods and systems in accordance with the present disclosure may advantageously improve the accuracy of geolocation.

In one embodiment, a method for providing a geolocation of a plurality of transmitters includes determining a relative location of each transmitter in the plurality of transmitters with respect to at least one other transmitter in the plurality of transmitters; determining an initial geolocation of the plurality of transmitters; computing a calibration factor by comparing the initial geolocation of the plurality of transmitters to the relative locations of the plurality of transmitters; and determining a calibrated geolocation of the plurality of transmitters by adjusting at least one final geolocation of the plurality of transmitters by the calibration factor.

In another embodiment, a system for providing a geolocation of a plurality of transmitters includes a plurality of transmitters, the plurality of transmitters configured for multidirectional signal communication, the plurality of transmitters operable to create a known relative location for each transmitter with respect to another transmitter; at least one receiver in multidirectional signal communication with the plurality of transmitters, the at least one receiver configured to determine a geolocation for each of the plurality of transmitters; a calibration module for generating a calibration factor determined by comparing the known relative locations to the geolocation of the plurality of transmitters; and an output module for determining a calibrated geolocation by adjusting a final geolocation of the plurality of transmitters by the calibration factor.

In a further embodiment, a system for providing a geolocation of a transmitter platform includes a platform configured with two or more spatially diverse transmitters, each transmitter configured to receive a signal and send a signal; at least one receiver in communication with the two or more spatially diverse transmitters, each receiver configured to send a signal and receive a signal to determine geolocations of the two or more spatially diverse transmitters; a computer for calculating a calibration factor determined by comparing a known relative location and the geolocations of the two or more spatially diverse transmitters; and an output calibrated geolocation display determined by adjusting a final geolocation of the plurality of transmitters by the calibration factor.

BRIEF DESCRIPTION OF THE DRAWINGS

Embodiments of the invention are described in detail below with reference to the following drawings.

DETAILED DESCRIPTION

Methods and systems for providing a geolocation of a plurality of transmitters are described herein. Many specific details of certain embodiments of the invention are set forth in the following description and in FIGS. 1 through 8 to provide a thorough understanding of such embodiments. One skilled in the art, however, will understand that the present invention may have additional embodiments, or that the present invention may be practiced without several of the details described in the following description.

Figure 1:
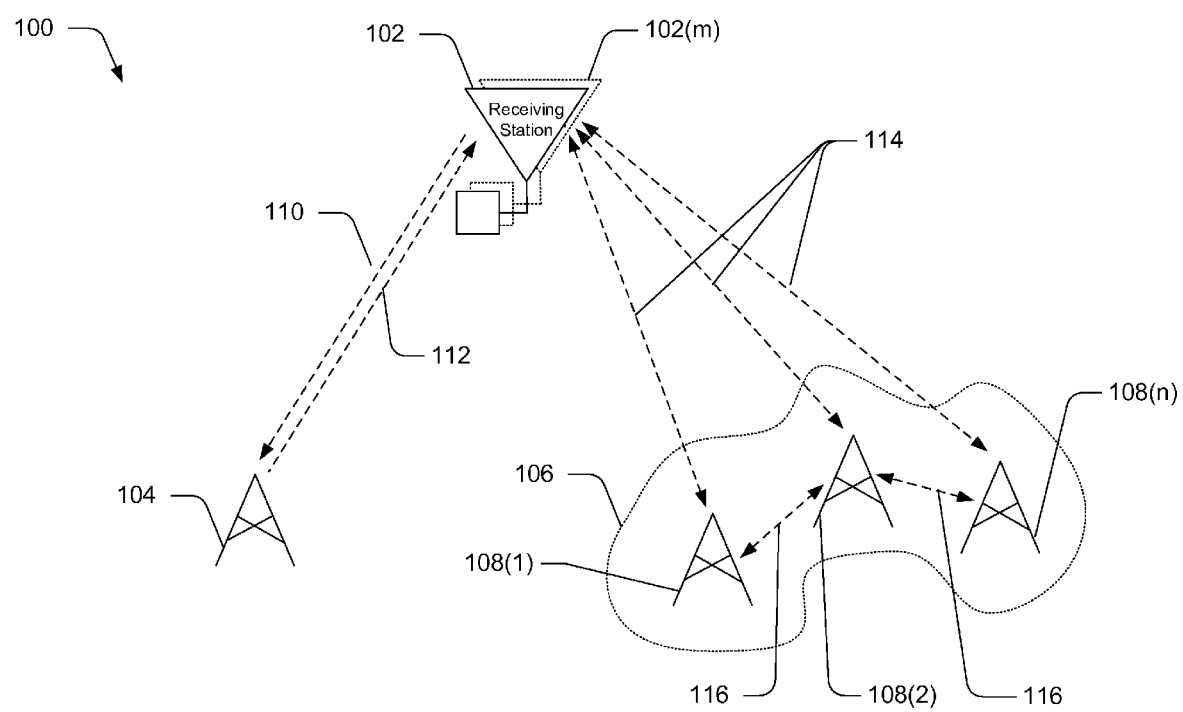
FIG. 1 is a schematic of a method or system of geolocation of a single transmitter and a plurality of transmitters in accordance with an embodiment of the invention.

FIG. 1 illustrates an overall environment 100 of methods and systems for providing a geolocation of a plurality of transmitters in accordance with an embodiment of the invention. The environment 100 includes a receiving station 102. In other embodiments, one or more additional receiving stations 102(m) may be included which operate similar to receiving station 102. The receiving station 102 may be able to receive one or more types of signals, such as RF (radio frequency), acoustic, image, or the like. The receiving station 102 may also transmit one or more types of signals. The utilization of multiple types of signals may allow fusion of different location methods to increase the overall accuracy of methods and systems of geolocation. For example, both RF and acoustic signals may be used in combination by the receiving station 102. Additionally, fusion of RF signals having different frequencies, or with different characteristics, may be utilized to improve geolocation.

The environment 100 also comprises a discrete transmitting station 104 and a plurality of associated transmitting stations 108(1)-108(n). The transmitting stations 108(1)-108(n) have known relative locations with respect to at least one other transmitting station 108(1), ..., 108(n), as described more fully below. The transmitting stations 104, 108(1)-108(n) may be (or include) any type of transmitter that is capable of two-way communication with the receiving station 102, including, for example, cell towers, cell phones, sonobuoys, two-way radios, CB (citizens band) radios, ground sensors, underwater acoustic arrays, or any other type of transmitter that has the ability to send and receive a signal from the receiving station 102. The transmitting stations 104, 108(1)-108(n) may receive and transmit the same type of signal (e.g., RF), or they may receive a first type of signal and transmit a second type of signal. Further, transmitting stations 104, 108(1)-108(n) may be able to receive and transmit more than one type of signal.

In an embodiment of the environment 100, the receiving station 102 may facilitate signal measurements of the signals relayed from the discrete transmitting station 104 to determine the separation distance, or geolocation, of the discrete transmitting station 104. The receiving station 102 may send an initiation signal 110 to the discrete transmitting station 104 which requests a return signal 112. The discrete transmitting station 104 may respond by sending the return signal 112, such as an RF signal, to the receiving station 102. The receiving station 102 may then determine the geolocation of the discrete transmitting station 104 by an analysis of the signal response characteristics between the initiation signal 110 and the return signal 112.

The receiving station 102, including any additional receiving stations 102(m), may utilize one or more methods of signal measurement to determine the geolocation of the discrete transmitting station 104. For example, the receiving station 102 may measure the signal response delay in time from the time the initiation signal 110 is sent by the receiving station 102 until the time the return signal 112 is received by the receiving station 102. This delay in time can then be converted into a measurable distance utilizing known scientific data relating to RF signal propagation characteristics through an atmosphere or other applicable environment. This process is commonly referred to as time-difference-of-arrival (TDOA). Additionally, the receiving station 102 may measure frequency (or frequency difference) of return signal and compare it to the frequency of the signal sent from the discrete transmitting station 104 (a known value). This is commonly known as frequency-difference-of-arrival (FDOA). Further, the angle-of-arrival (AOA) and other signal location parameters of each transmission may be measured to establish the geolocation of a discrete transmitting station 104. In another embodiment, multiple receivers, such as 102(m), may be utilized to conduct differential techniques for measurements, thus comparing measurements in order to produce a more accurate geolocation of the discrete transmitting station 104.

In yet another embodiment of the environment 100, the receiving station 102 may send and receive signals (collectively 114) from the plurality of associated transmitting stations 108(1)-108(n). For example, each associated transmitting station 108(1), ..., 108(n) may send the receiving station 102 a signal 114, such as an RF signal, to enable the receiving station 102 to determine the geolocation of the each associated transmitting station 108(1), ..., 108(n).

As noted above, the associated transmitting stations 108(1)-108(n) have known relative locations with respect to at least one other associated transmitting station 108(1), ..., 108(n). For example, a first transmitting station 108(1) may communicate 116 with an associated transmitting station 108(2) to determine the relative location of the first transmitting station 108(1) with respect to the associated transmitting station 108(2). Further, other associated transmitting stations 108(1), ..., 108(n) may establish relative locations with respect to at least one other associated transmitting station 108(1), ..., 108(n). Therefore, the number of relative locations is equal to n−1, where n is the number of transmitting stations. In another embodiment, the relative location is a pairwise relative distance or vector for each associated transmitting station 108(1), ..., 108(n). Therefore, the number of pairwise relative distances x is equal to:

$$x = \frac{n(n-1)}{2} \qquad \text{Eq (1)}$$

where n is the number of transmitting stations. The established relative locations may be determined utilizing the same means of signal analysis utilized by the receiving station 102, such as TDOA, FDOA, or AOA. Therefore, all the associated transmitting stations 108(1)-108(n) have determined relative locations with at least one other associated transmitting station 108(1), ..., 108(n).

With further reference to FIG. 1, the receiver 102 may determine the geolocation of the plurality of associated transmitting stations 108(1)-108(n), each associated transmitting station 108(1)-108(n) having a determined known relative location, with improved positional accuracy than receiving location 102 may be able to determine the geolocation of transmitting station 104, which does not have a known relative location. The improved positional accuracy of the plurality of associated transmitting stations 108(1)-108(n) utilizes a calibration factor, determined from comparing initial geolocations from the associated transmitting stations 108(1)-108(n) to the relative locations of the associated transmitting stations 108(1)-108(n), to enable the determination of a calibrated geolocation of the plurality of associated transmitting stations 108(1)-108(n). In some embodiments, additional calibration factors may be utilized to determine a calibrated geolocation of a plurality of associated transmitting stations 108(1)-108(n). The number of calibration factors may vary depending on the number of receivers and the geolocation method utilized such as TDOA, FDOA, or AOA. For example, with TDOA and FDOA, the number of calibration factors y for each transmitter may be equal to:

$$y = \frac{m(m-1)}{2} \qquad \text{Eq (2)}$$

where m is the number of receivers, however fewer calibration factors may be utilized. For AOA, the number of calibration factors x for each transmitter may be equal to the number of receivers m, however fewer calibration factors may be utilized. The number of calibration factors may be reduced or increased accordingly if multiple initial geolocations are obtained or one or more receivers reposition, such as when at least one receiver is in motion. Further, calibration factors may be created by combining sub-calibration factors to reduce the number of overall calibration factors utilized to create a calibrated geolocation.

The calibration factors may be determined by various methods. In one embodiment, the calibration factor may be created as discussed below. A system may include an array of n transmitters, each with specific relative location information. The relative location information may be calculated as x in Equation 1 above for distance measurements between each pair of transmitters, however fewer distance measurement may be utilized. The system may also include m fixed receivers (m>=2), however other embodiments may include the same number or fewer receivers in motion. TDOA is utilized for obtaining the initial geolocation for each transmitting station. For each transmitter signal, the m signal receptions may be correlated in pairs as y, in Equation 2 above, thus the time-difference-of-arrival geolocations would be obtained, one for each pair of receivers. Therefore, the total number of initial geolocations may be (y)(n), where one set of initial geolocations are obtained for each transmitting station (e.g., $T_1, T_2, \ldots T_n$). The geolocation process may take a set of receiver locations and additional information (including known biases) and form a geolocation estimate for each transmitter, such as $T_1G_i$.

Due to a number of factors previously described, unknown and uncorrected bias errors are present in the initial geolocation, such as bias errors from atmospheric conditions, multipath conditions, and other unknown or uncorrected biases in each receiver. These bias errors typically cannot be determined prior to an initial geolocation. However, comparing the initial geolocation data to the relative distance information allows determination of the bias effects. The initial set of geolocations of each transmitter can be utilized to compute the estimated relative distances. This is a set of x distances, calculated in Equation 1 above, that can be compared with the known relative distances. An error e may be computed based on the normalization of the vector of differences between the estimated and known relative distances of the transmitters. A vector b of unknown biases of length y, calculated in Equation 2 above, is set to zero. Next, the process of minimizing the relative distance error e occurs by searching over the values of the vector b, computing for each such value G(T+b) and a new error e based on the normalization of the difference between x and the pairwise relative distances of G(T+b), where T is a vector (e.g., $T_1, T_2, \ldots T_N$) and G is the geolocation function. This minimization process can be accomplished using a number of techniques including gradient descent and quasi-Newton methods. While only one method of determining the calibration factors is presented above, it is contemplated that additional methods may be utilized while still remaining within the spirit and scope of the invention.

Figure 2:
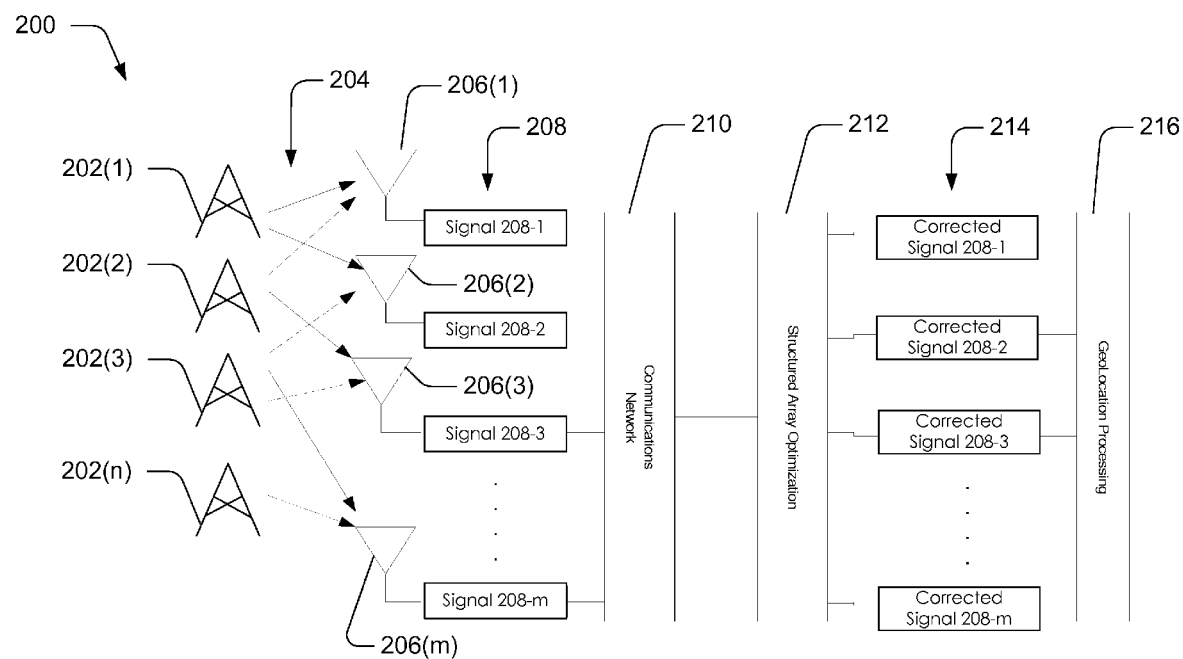
FIG. 2 is a schematic of a method or system of geolocation of a plurality of transmitters with known relative locations in accordance with another embodiment of the invention.

FIG. 2 illustrates an overall environment 200 for geolocation a plurality of transmitters with known relative locations in accordance with an embodiment of the present invention. The environment includes a number of transmitting stations 202(1), 202(2), 202(3), ... 202(n). The transmitting stations 202(1)-202(n) send return signals 204 to receiving stations 206(1), 206(2), 206(3), ... 206(m). As depicted in FIG. 2, a transmitting station, such as transmitting station 202(1) may send the return signal 204 to more than one receiving station, such as receiving stations 206(1) and 206(2). The transmitting stations 202(1)-202(M) may send signals 204 to any number of receiving stations 206(1)-206(m).

Each receiving station 206(1)-206(m) includes a signal processing component 208. A communications network component 210 is coupled to the signal processing components 208 of the receiving stations 206. The communications network component 210 processes signal information obtained from the receiving stations 206(1)-206(m) through the signal processing components 208 to determine an initial geolocation of the transmitting stations 202(1)-202(n).

A structured array optimization component 212 is coupled to the communications network component 210 and is configured to process the relative locations of the transmitter stations (see FIG. 1, 116) and the geolocation of the transmitting stations 202(1)-202(n) to determine a calibration factor (or optimization factor). The calibration factor is utilized to adjust the signal information in the signal processing components 208 from the receiving stations 206(1)-206(m) to produce corrected signals 214, and in turn an improved geolocation processing 216 (or calibrated geolocation) for the respective transmitting stations 202(1)-202(n).

Figure 3:
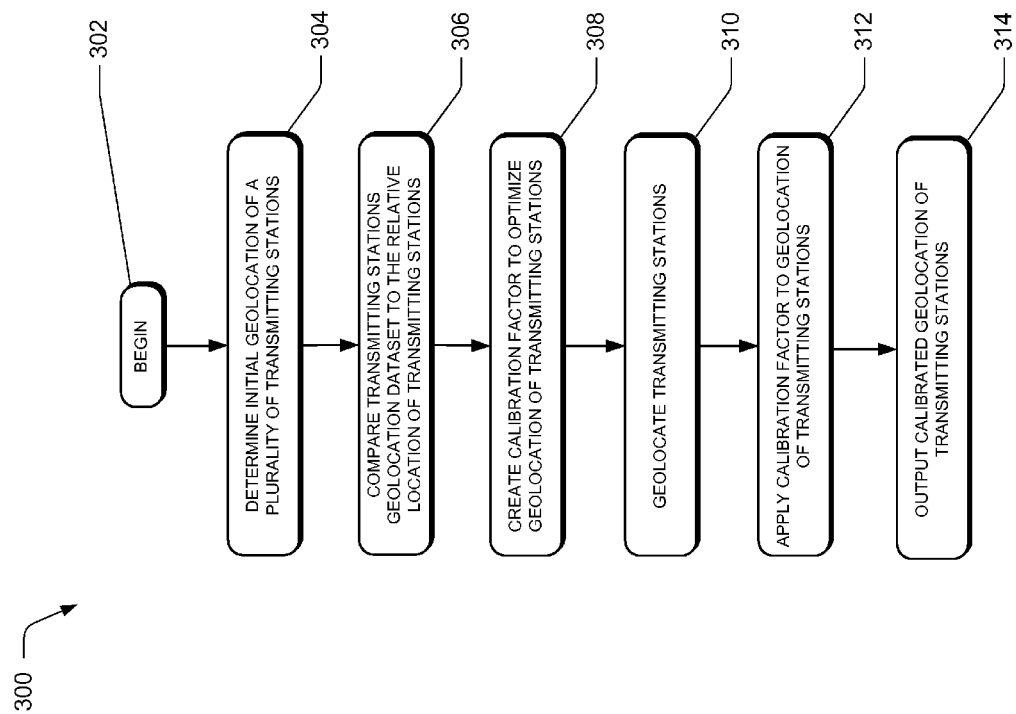
FIG. 3 is a flow diagram of a method of geolocation of a plurality of transmitters with known relative locations in accordance with yet another embodiment of the invention.

FIG. 3 is a flow diagram of a method 300 of geolocation of a plurality of transmitters with known relative locations in accordance with an embodiment of the invention. The method 300 begins at block 302. At block 304, an initial geolocation of a plurality of transmitting stations is determined. For example, if three transmitting stations exist, each transmitting station is geolocated to produce a first data set of the plurality of transmitting stations.

Once the desired data set has been obtained, at block 306, the transmitting station geolocation data set is compared to relative locations of the transmitting stations. The relative locations of the transmitting stations may be determined by communication and signal measurement between the transmitters, by obtaining known relative location information, by calculating the relative locations based on data, or by other suitable methods for establishing known locations of the transmitting stations. At block 308, a calibration factor is created to improve the geolocation of the transmitting stations. The calibration factor may be determined by any number of ways such that the calibration factor, when applied to transmitting station geolocation data, improves the geolocation accuracy when compared to the geolocation data without the applied calibration factor, such as the transmitting station initial geolocation data in block 304.

At block 310, the geolocation of the transmitting stations is obtained. This geolocation of the transmitting stations may be a new geolocation data set, or it may be the data set determined in block 304. At block 312, the calibration factors are applied to the geolocation of the transmitting stations to create a calibrated geolocation for the plurality of transmitting stations. At block 314, the calibrated geolocation of the transmitting stations is outputted. The output may include displaying the geolocation on a computer display, delivering it to a secondary system or process, or other useful output of this information which may utilize improved geolocation of a plurality of transmitting stations.

Figure 4:
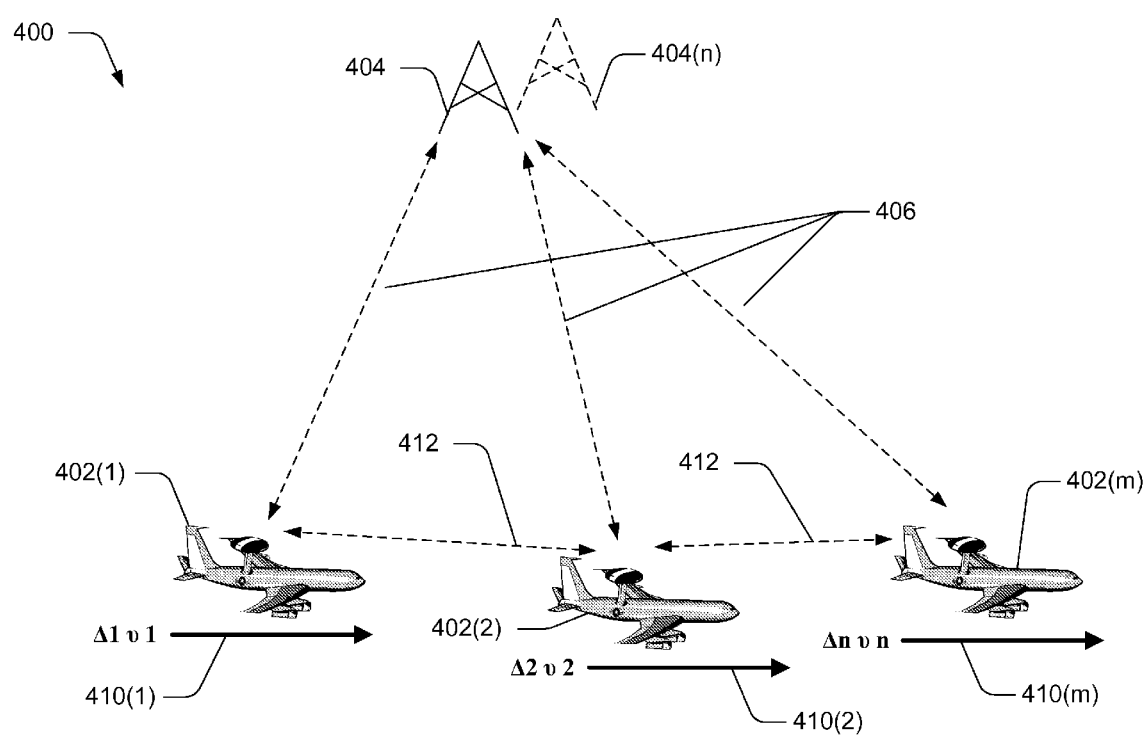
FIG. 4 is a schematic of a method or system of geolocation utilizing a plurality of receivers in motion in accordance with an embodiment of the invention.

FIG. 4 illustrates an overall environment 400 of methods and systems for providing a geolocation utilizing a plurality of receivers in motion in accordance with another embodiment of the invention. In environment 400, a plurality of receiving stations are depicted 402(1), 402(2), ..., 402(m). As discussed above, the receiving stations 402(1)-402(m) may include may be any type of receiver that has the ability to send and receive a signal from at least one transmitting station 404, however more transmitting stations 404(n) may be included in the environment 400. In this particular embodiment, the receiving stations 402(1)-402(m) are included in an aircraft. In further embodiments, receiving stations may be included in other moveable vehicles or platforms, such as automobiles, trucks, maritime vessels, submarines, weapons, missiles, aircraft, unmanned aerial vehicles, buses, trains, railroad equipment, and other types of manned or unmanned mobile platforms.

The receiving stations 402(1)-402(m) are in communication with the transmitting station 404. The receiving stations 402(1)-402(m) may send signals and receive signals (collectively 406) from the transmitting station 404. In other embodiments, additional transmitting stations 404(n) to receive and transmit signals with the receiving stations 402(1)-402(m). Additionally, each receiving station 402(1), . . . , 402(m) may send and receive signals (collectively 408) with at least one other receiving station 402(1), . . . , 402(m) in order to establish a relative location for each receiving station 402(1), . . . , 402(m).

As indicated above, the receivers in the environment 400 are included on aircraft. In environment 400, one or more of the aircraft may be in motion. Each aircraft, and thus each corresponding receiving station 402(1), . . . , 402(m), may have a motion 410(1), 410(2), . . . , 410(m), with a corresponding direction ($\Delta$) and velocity (v), such as $\Delta 1$ v1, $\Delta 2$ v2, . . . , $\Delta$n vn. The relative location for each receiving station 402(1), . . . , 402(m) may be computed based on the motion 410(1), . . . , 410(m), of the receiving aircraft. Additionally, the relative location may be determined at a point in time to establish the known relative locations. Therefore, the relative location of a plurality of receiving stations may be determined or calculated when one or more of the receiving stations 402(1)-402(m) are in motion 410(1), . . . , 410(m), allowing a calibration factor to be created, such as discussed above (e.g. FIG. 3, block 312).

Figure 5:
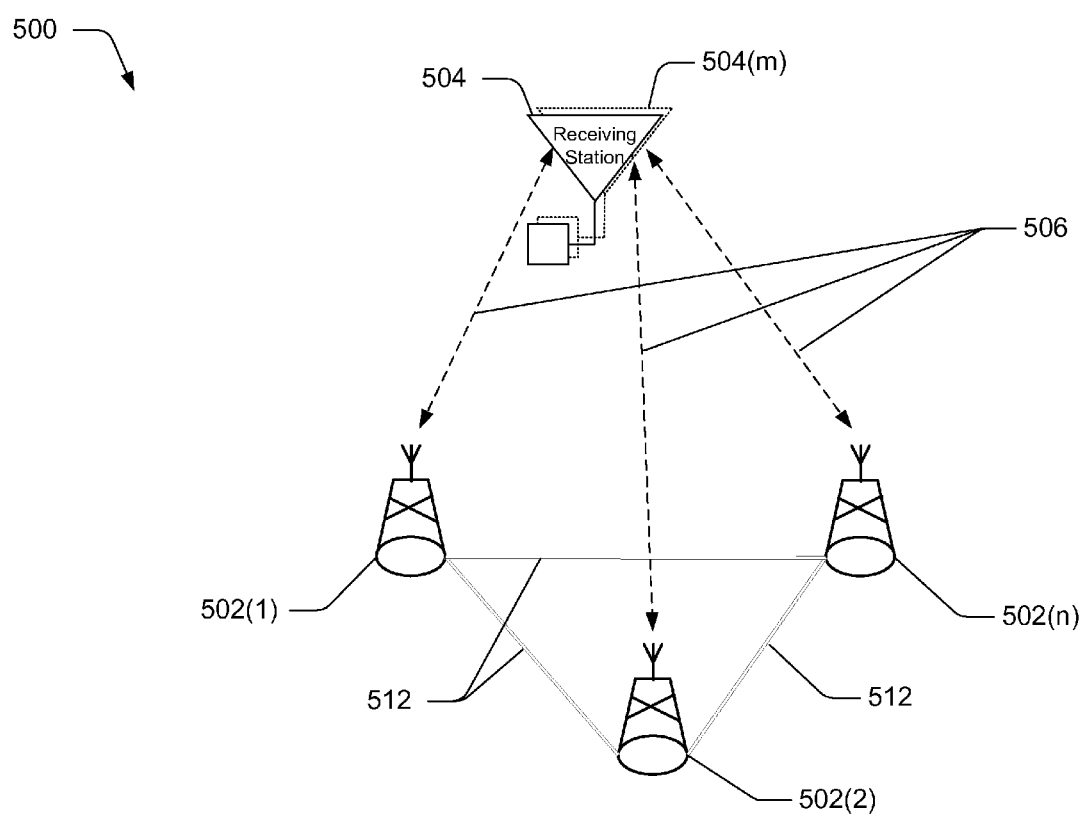
FIG. 5 is a schematic of a method or system of geolocation of a plurality of transmitters in connection in accordance with another embodiment of the invention.

FIG. 5 illustrates an overall environment 500 of methods and systems for providing a geolocation of a plurality of transmitters in connection in accordance with another embodiment of the invention. In environment 500, a plurality of transmitting stations are depicted 502(1), 502(2), . . . , 502(n) which receive and transmit signals 506 with at least one receiving station 504, however additional receiving stations 504(m) may be present. In environment 500, the transmitting stations 502(1)-502(n) may be located on any type of platform, such as a sonobuoy, that may be connected 512 to one another to establish a known relative location. For example, the transmitting stations 502(1)-502(n) may be connected 512 by a rigid structure with a known length or a length that may be calculated. Alternatively, a single platform may include two or more of the transmitting stations 502(1)-502(n). For example, a ship may have one transmitting station on the bow and one transmitting station on the stern, whereas a known relative location is established by the connection 512 (i.e., the hull of the ship). In environment 500, the geolocation of the plurality of transmitting stations may only include one desirable location, such as a key reference location. The key reference location may be the location of one of the transmitting stations 502(1), 502(2), . . . , 502(n), or it may be another location in the proximity of the transmitting stations 502(1)-502(n), such as a median point between the plurality of transmitting stations 502(1)-502(n).

Figure 6:
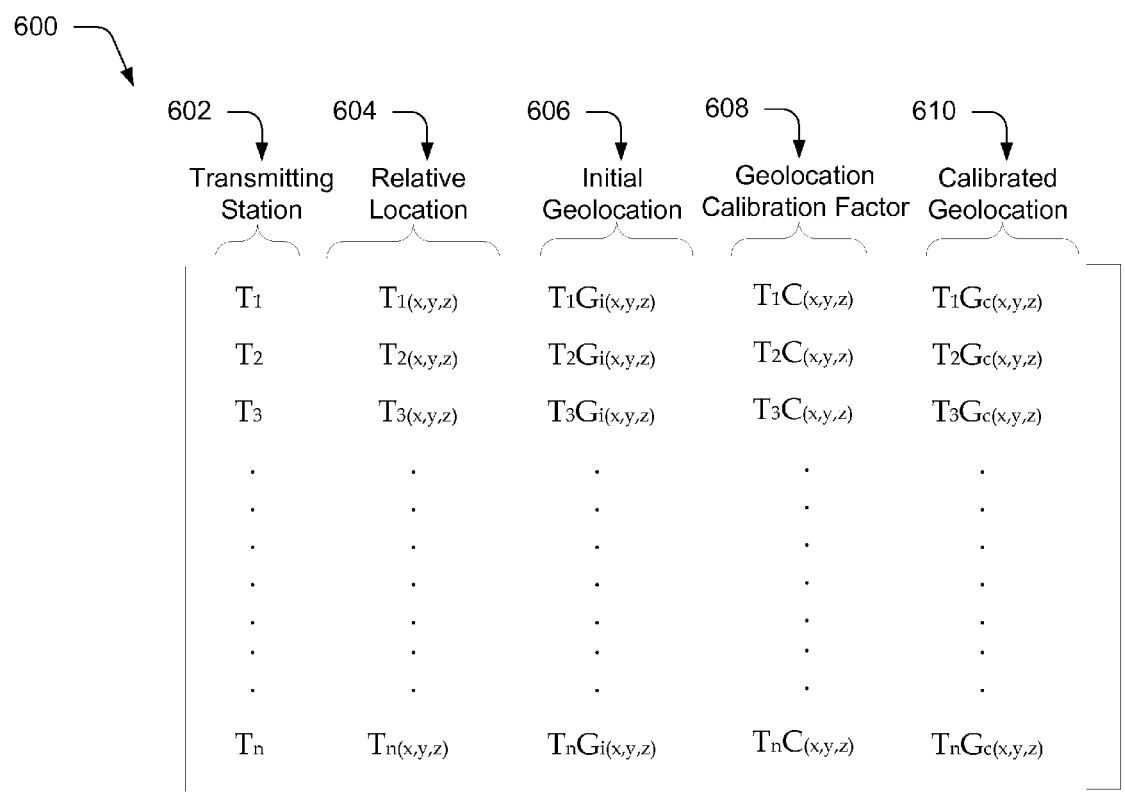
FIG. 6 is an exemplary dataset of a method of calculating a calibration factor for improving the geolocation accuracy of a plurality of transmitters in accordance with another embodiment of the invention.

FIG. 6 is an exemplary dataset 600 of a method of calculating a calibration factor for improving the geolocation accuracy of a plurality of transmitters in accordance with another embodiment of the invention. The dataset 600 may be rows and columns of data relating to the geolocation of a plurality of transmitting stations 602, such as T(1)-T(n).

Each transmitting station 602, such as T(1), T(2), . . . , T(n), may have a relative location 604, such as T1(x,y,z) where (x,y,z) represents a location in a Cartesian coordinate system. Other coordinate system information or means of identifying a particular location may be utilized, such as Euler angles for each axes of rotation. For example, the relative location 604 may be calculated by determining the difference in location between two of the transmitting stations 602, such as by subtracting T2(x,y,z) from T1(x,y,z) to produce the relative location 604 for T1, the transmitting station 602. The relative location 604 may be determined from another transmitting station 602, such as T(3), . . . , T(n). In one embodiment, a single transmitting station 602 may establish the relative location 604 of all of the other transmitting stations 602. In other embodiments, multiple transmitting stations 602 may establish parts of the relative location 604 of the collective plurality of transmitting stations 602, thus enabling the relative locations to be pieced together for the plurality of transmitting stations 602. In another embodiment, the relative location may be a pairwise relative distance or vector for each associated transmitting station.

An initial geolocation of the transmitting stations 602 may be included in the dataset 600, such as initial geolocations 606. The initial geolocations 606 may include one or more columns for each transmitting station 602. Each column may represent one initial geolocation 606. In the dataset 600, the initial geolocations 606 include T1Gi(x,y,z) through TnGi(x,y,z). In one embodiment, the receivers (FIG. 1, 102, 102(m)) are stationary with respect to the transmitters. In this embodiment, one initial geolocation may be obtained for each unique receiver and transmitter combination in the system. Therefore, for m receivers, there would be m geolocation samples per transmitter, and a total of (m)(n) initial geolocations, where n is number of transmitters. In another embodiment, one or more receivers may be in motion relative to the transmitters. In this embodiment there may be a variable number of initial geolocations (i.e., processed signal receptions) over a period time. The number of initial geolocations in this embodiment may be determined by factors such as relative velocities, geometry, noise, signal duration and desired accuracy.

The relative location 604 and the initial geolocation 606 are utilized to create the geolocation calibration factor 608. The geolocation calibration factor 608 may include one or more calibration factor. For example, if more than one method of transmitting station location measurement is utilized, such as by RF TDOA and RF FDOA, then one or more calibration factors may be computed for each type of location measurement. The geolocation calibration factor 608 may be utilized to generate a calibrated geolocation 610 in dataset 600.

If multiple receiving stations are utilized in geolocation of transmitting stations, then each receiving station may have its own dataset, such as the dataset 600, or the datasets may be combined into a single dataset. Additionally, it should be appreciated that other methods of calculating a geolocation calibration factor may be utilized and are still within the spirit and scope of the present invention. Further, although data in the dataset 600 is discussed as representing a single column, the actual data in a database or other computer program may require additional spaces, characters, cells, columns, or rows.

Figure 7:
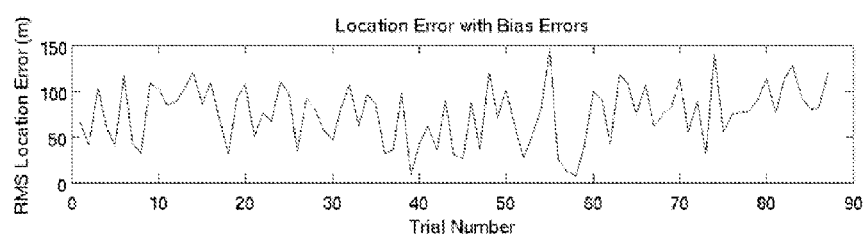
FIG. 7 is a chart illustrating location error for a number of data samples for a geolocation of a plurality of transmitters in accordance with an embodiment of the invention.
Figure 8:
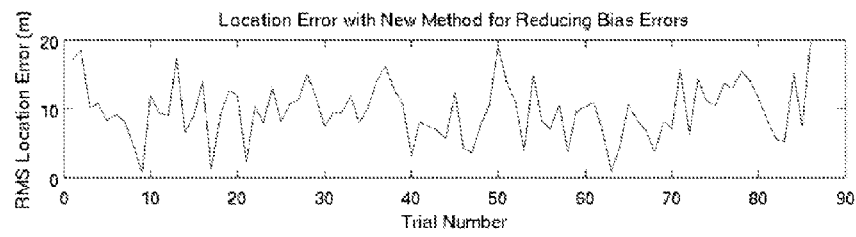
FIG. 8 is a chart illustrating location error for a number of data samples for a calibrated geolocation of a plurality of transmitters in accordance with another embodiment of the invention.

FIGS. 7 and 8 illustrate location error for a number of data samples for a geolocation of a plurality of transmitters determined in accordance with the prior art (chart 700) and determined in accordance with an embodiment of the invention (chart 800).

More specifically, in FIG. 7, the chart 700 depicts the location error with bias errors as determined using conventional non-calibrated geolocation of one or more transmitters. For example, the transmitting station 104 in FIG. 1 or the initial geolocations 606 shown in FIG. 6 may produce location error with bias error because they do not utilize a calibration factor created from known relative locations. In the chart 700, the RMS (root mean square) location error range example data varies between 0 meters and 150 meters (from the actual location for the transmitting station) for the series of trial numbers, or sample location readings.

On the other hand, in FIG. 8, the chart 800 depicts the similar information after a calibration factor has been applied to the information measured by a receiving station using a method in accordance with the invention. The location error with a new method for reducing bias errors is the example data of a geolocation created by the methods and systems of an improved geolocation of a plurality of transmitters, thus utilizing a calibration factor determined by incorporating known relative position information. In the chart 800, the RMS location error range example data is greatly reduced from that in the chart 700, whereas the range in the chart 800 varies from 0 meters to 20 meters. Therefore, the sample data in the chart 800 depicts an improved geolocation of a transmitting station over the geolocation results depicted in the chart 700. The charts 700, 800 depict general attributes of methods and systems of providing an improved geolocation of a plurality of transmitting stations, however, it will be appreciated that variations of the chart may exist while still remaining within the spirit and scope of the present invention.

Embodiments of the invention may provide advantages over the prior art. For example, besides greater geolocation accuracy, embodiments of the invention may offer a means of creating spatial diversity in order to simultaneously increase location precision. This may allow a system designer to add spatial diversity without increasing any other performance characteristic (e.g., total power, bandwidth, frequency range, etc). The system designer may still be able to increase the location precision of a plurality of transmitters, utilizing the methods or systems disclosed herein, over a single transmitter. If sufficient physical space is available, systems may be redesigned to utilize spatial diversity. For example, a system designer may desire to create a more accurate sonobuoy geolocation system for submarine navigation through an ocean. Rather than placing a single sonobuoy (transmitting station) in a location as a navigation reference, the designer may instead utilize a plurality of sonobuoys with spatial diversity. The plurality of sonobuoys utilize the methods and systems disclosed in this invention relating to establishing known relative locations among the sonobuoys to create a calibration factor for improved geolocation. Therefore, a submarine in this example may experience improved navigation due to improved location information resulting from the methods and systems of an improved geolocation of the plurality of transmitting stations.

While preferred and alternate embodiments of the invention have been illustrated described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. A method of modifying a location calculation for a group of transmitters, the method comprising:

determining relative locations for the group of transmitters by obtaining a relative location of each of the transmitters with respect to at least one other transmitter in the group of transmitters;

determining initial geolocations for the group of transmitters, the initial geolocations determined by an external receiver that is not part of the group;

calculating distances between the transmitters from the initial geolocations;

comparing the calculated distances to the relative locations to compute at least one calibration factor for the group, the at least one calibration factor being used to adjust subsequent geolocations of the group to substantially include the relative locations of the transmitters; and calculating calibrated geolocations for the group of transmitters from the subsequent geolocations that are modified by the at least one calibration factor.

2. The method of claim 1, wherein the group of transmitters are configured for two-way communication with the external receiver by at least one of radio frequency, signals and acoustic signals.

3. The method of claim 1, wherein the relative locations and geolocations are established by at least one of time-difference-of-arrival, frequency-difference-of-arrival, and angle-of-arrival.

4. The method of claim 3, wherein the geolocations include fusion of two or more types of transmitter communication processes for locating the transmitters.

5. The method of claim 1, wherein the geolocations are measured by differential techniques utilizing two or more of the external receivers for geolocation of the group of transmitters.

6. The method of claim 1, further comprising storing the calibration factor in a storage medium.

7. The method of claim 1, wherein the group of transmitters are selected from a group consisting of:

sonobuoys;

ground sensors;

a convoy of vehicles;

embedded cell phone arrays; and underwater acoustic arrays.

8. The method of claim 1, wherein at least one of the transmitters has a known trajectory with respect to another one of the transmitters of the group of transmitters.

9. The method of claim 1, wherein the transmitters are physically connected to each other to establish known relative locations between the group of transmitters.

10. The method of claim 1, wherein the group of transmitters enable a geolocation of a single representative location for the group of transmitters.

11. A system for providing a calibrated geolocation of a plurality of transmitters, the system comprising:

a group of transmitters, configured for multidirectional signal communication, the group of transmitters operable to create a known relative location for each of the transmitters with respect to another transmitter in the group of transmitters;

at least one external receiver in multidirectional signal communication with the group of transmitters, the at least one external receiver configured to determine a geolocation for each of the group of transmitters;

a calibration module for generating a calibration factor determined by comparing the known relative locations to calculated distances between the transmitters from the initial geolocations; and an output module for outputting at least one calibrated geolocation that is determined by adjusting a subsequent geolocation of the group of transmitters by the calibration factor.

12. The system of claim 11, wherein the geolocations are determined by two or more external receivers in communication with the group of transmitters.

13. The system of claim 11, wherein the known relative locations of the group of transmitters are established by geolocation between the group of transmitters.

14. The system of claim 11, wherein the known relative locations of the group of transmitters are established by physical interconnections between the group of transmitters.

15. The system of claim 11, further comprising a storage medium for storing the calibration factor.

16. The system of claim 11, wherein at least one of the group of transmitters is in motion with respect to the the at least one external receiver.

17. The system of claim 16, wherein at least one of the group of transmitters is located on a first vehicle and the at least one external receiver is located on a second vehicle.

18. The system of claim 11, wherein the geolocations are determined using fusion of two or more geolocating processes, the geolocating processes being selected from time-difference-of-arrival, frequency-difference-of-arrival, and angle-of-arrival.

19. A geolocation system comprising:
a platform configured with two or more spatially diverse transceivers;
an external transceiver in communication with the two or more spatially diverse transceivers, the external transceiver configured to determine geolocations of the two or more spatially diverse transceivers;
a processor to:
  calculate calibration factors by comparing known relative locations of the two or more spatially diverse transceivers to measured distances between the two or more spatially diverse transceivers using the geolocations, and
  calculate calibrated geolocations for the two or more spatially diverse transceivers by modifying subsequent geolocations using the calibration factors, the subsequent geolocations obtained by the external transceiver; and
a display to display the calibrated geolocations for the two or more spatially diverse transceivers.

* * * * *